No. 719,698. PATENTED FEB. 3, 1903.
H. F. D. SCHWAHN.
PROCESS OF PRODUCING ALUMINIUM.
APPLICATION FILED APR. 9, 1900.
NO MODEL.
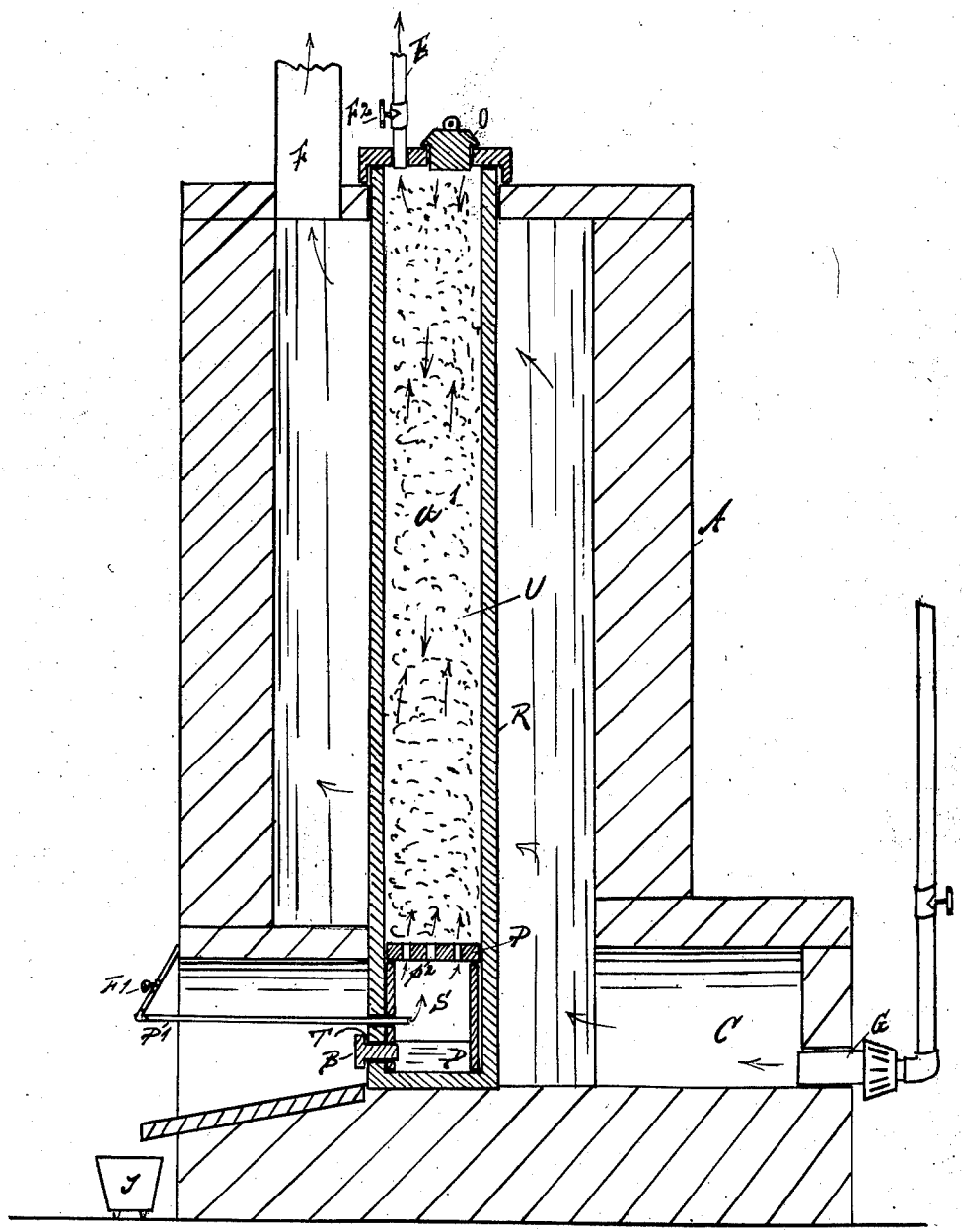

UNITED STATES PATENT OFFICE.

HEINRICH F. D. SCHWAHN, OF ST. LOUIS, MISSOURI.

PROCESS OF PRODUCING ALUMINIUM.

SPECIFICATION forming part of Letters Patent No. 719,698, dated February 3, 1903.

Application filed April 9, 1900. Serial No. 12,150. (No specimens.)

*To all whom it may concern:*

Be it known that I, HEINRICH F. D. SCHWAHN, a citizen of the United States, and a resident of the city of St. Louis, in the State of Missouri, have invented a new and useful Process of Producing Aluminium, of which the following description is so full, clear, and exact as to enable those skilled in the art to which it appertains to use the same.

The object of my present invention is to provide a practical method for producing aluminium which shall admit of the production of the metal with an economy not heretofore possible.

My invention consists in subjecting certain aluminium compounds, of which aluminium sulfate may be taken as a type, to heat in the presence of a reducing agent containing sulfur, as hereinafter specified. The operation is conducted within a substantially closed retort, whereby the atmosphere may be excluded and a slight pressure of reducing-gases maintained.

As raw material for reduction to aluminium I preferably employ hydrous aluminium sulfate $Al_2(SO_4)3+16H_2O$, but may substitute therefor the oxid, sulfid, or other compound. If the hydrous sulfate be used, it is preferably preliminarily calcined at a moderate temperature, whereby it loses its water of crystallization and is converted into a light porous mass readily permeable by gases.

As a reducing agent I may employ a hydrocarbon gas, of which natural gas, the gases derived from the decomposition of carbids, those resulting from the treatment of crude coal-oil or from the distillation of soft coal may be taken as types, a mixture of such gases, water-gas, producer-gas, or carbon monoxid. Preferably, however, I employ the products resulting from the distillation of soft coal, the essential condition according to my invention being the presence in such gases of a certain definite proportion of sulfur. If the gas itself or the material employed for the generation thereof contains normally sufficient sulfur to effect the reactions, as hereinafter specified, no further treatment is necessary; otherwise I add a definite proportion, preferably about five per cent., of a sulfur-bearing compound, as carbon disulfid.

Instead of treating the aluminium compound by a reducing-gas, as above specified, I may mix with said aluminium compound a carbonaceous reducing agent, as a soft coal of high sulfur content, which is capable of yielding such gas in contact with the aluminium compound and at a sufficient temperature of effecting the reduction to metal.

My invention consists then in reducing an aluminium compound, preferably the porous sulfate, by a reducing agent, of which sulfur is a component.

For a clear understanding of the invention reference is made to the accompanying drawing, wherein a retort R of graphite, such as is commonly employed for the production of crucible, is shown supported in an upright position within the walls A in such manner as to provide encircling flues for the heated gases proceeding from the hydrocarbon-burner G and introduced through the chamber C.

F represents an escape-flue for the waste gases. Within the retort and in its lower portion a support P is provided for the charge, apertured, as at $p^2$, for the admission to the charge of the reducing-gas. The gases derived from the reaction, together with such excess of reducing-gas as may be present, escape through the flue E, shown as provided with a valve or damper $F^2$.

The charging-opening is preferably in the cover of the retort and is provided with a suitable closure O. Beneath the support P is the chamber S, into which the reducing-gas is introduced. A tap-hole T and plug B are provided for the withdrawal of the reduced metal, which is conducted by the usual runway to the collecting vessel *j*. Into this chamber S is introduced a pipe P', provided with a regulating-valve, as shown at F', and serving for the introduction of a reducing agent of the character hereinbefore specified.

I will now describe the operation of producing aluminium, taking for the purpose of illustration the production of the metal from the hydrated sulfate by means of heat, a hydrocarbon gas, and a sulfur compound. As a sulfur compound I will take carbon disulfid as an example.

The hydrous sulfate is mixed with a certain small proportion of a suitable flux, preferably a compound of an alkali metal, as sodium chlorid. The advantage possessed by a flux of this character is that it facilitates the reaction without contaminating the aluminium. The hydrous sulfate and flux are calcined at a moderate temperature in a reverberatory furnace, broken into pieces about the size of a walnut, and charged, as shown at $a'$, into the interior U of the retort. The latter is then brought to a sufficient temperature, which need not exceed a bright red heat or, say, 800° to 900° centigrade by means of the burner G, and the reducing-gas consisting of a hydrocarbon containing about five per cent. of carbon disulfid is introduced through the pipe P'. Owing to the porous or multicellular character of the charge, every part thereof is subjected to the action of the reducing-gases, and the reduced metal flows through the apertures $p^2$ and collects, as shown at D, in the lower portion of the chamber S. Preferably the reducing-gases are maintained at a slight pressure within the retort to insure that they penetrate and permeate the entire body of the charge. The current of reducing-gas is preferably, as shown, in an upward direction through the incandescent body of the charge. The rate of movement of the gas is regulated by the speed of the reaction, which can easily be determined by an examination of the gases discharged through the flue E. The operation is preferably continuous in character, additional quantities of the charge being introduced at the upper portion of the retort and the metal tapped therefrom continuously or at intervals. I find that there is also produced, apparently as an intermediate product of the reaction, a coke-like substance, which is infusible at the temperature employed, but the nature of which has not been fully determined. This substance contains both carbon and sulfur and may be a sulfocarbonate of aluminium, a compound not heretofore known. Aluminium sulfid in a porous condition is more easily reduced than any other readily-obtainable compound of the metal, and the ease with which the sulfate is reduced according to my process may be explained by assuming that the sulfur compound which is present serves to progressively convert the sulfate into sulfid and the coke-like mass above referred to. This sulfid is then reduced by the sulfur-bearing hydrocarbon gas, such reduction being facilitated, as before stated, by the maintenance of a slight pressure of the reducing agent in excess of that of the atmosphere. It may be further assumed that by the introduction of the carbon disulfid with the hydrocarbon gas but a small proportion of aluminium sulfid is present at any given period of the reaction and that the large excess of infusible sulfate maintains the mass in an open and permeable state. The coke-like product being infusible at the temperature employed aids in maintaining the porosity of the charge.

The following reactions, whereby aluminium sulfate may be reduced to sulfid by carbon disulfid, are established:

$$5Al_2(SO_4)_3+12CS_2=5Al_2S_3+24SO_2+12CO;$$
$$2Al_2(SO_4)_3+5CS_2=2Al_2S_3+5COS+5SO_2.$$

These reactions are introduced merely as indicating the probable course of the reduction. In addition it is highly probable that other reactions occur and that aluminium oxid is present in small quantities.

As above stated, other compounds of aluminium may replace the sulfate with corresponding variations in the reaction of reduction.

If aluminium oxid prepared in a porous condition by heating the sulfate be employed, I find that under the influence of the described reducing agent it passes readily into the coke-like mass above referred to and is then reduced by the sulfur-bearing hydrocarbon gas to metal, or if carbon in any form be present in admixture with the sulfate this same infusible coke-like mass is formed under the action of the sulfur-bearing reducing agent. The essential feature in all cases, whatever be the character of the raw material chosen for reduction, is the presence in the reducing agent of sulfur in some form.

Certain modifications of the method will suggest themselves to those skilled in the art. For instance, the reducing-gases may be heated to any desired temperature before introduction into the retort, the proportions of the reagents, as stated, may be widely departed from, and the process may be applied to the production of alloys of aluminium.

I claim—

1. The herein-described process of reducing an aluminium compound, which consists in subjecting such compound to the action of a reducing agent of which sulfur is a component, at a temperature sufficient to effect the reduction.

2. The herein-described process of reducing an aluminium compound, which consists in subjecting such compound to the action of a reducing agent consisting of a hydrocarbon gas containing sulfur, at a temperature sufficient to effect reduction.

3. The herein-described process of reducing an aluminium compound, which consists in subjecting such compound, at a temperature sufficient to effect the reduction, to a mixture of a gaseous reducing agent and carbon disulfid.

4. The herein-described process of reducing an aluminium compound, which consists in subjecting such compound at a temperature sufficient to effect the reduction, to the action of a reducing-gas of which sulfur is a component, and maintaining such gas at a pressure in excess of that of the atmosphere.

5. The herein-described process of reducing an aluminium compound, which consists in subjecting such compound at a temperature sufficient to effect the reduction, to the action of an upwardly-moving current of a reducing-gas of which sulfur is a component.

6. The herein-described process, which consists in subjecting porous aluminium sulfate, at a temperature sufficient to effect its reduction, to the action of a reducing agent of which sulfur is a component.

HEINRICH F. D. SCHWAHN.

Witnesses:
J. GEORGE HEID,
HY. G. OHEIM.